Oct. 17, 1961 R. A. WILKINS 3,004,330
TUBES FOR STRUCTURAL AND FLUID CONDUCTING PURPOSES, AND
METHODS OF MAKING THE SAME
Filed May 23, 1957 2 Sheets-Sheet 2
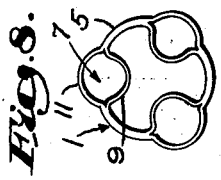
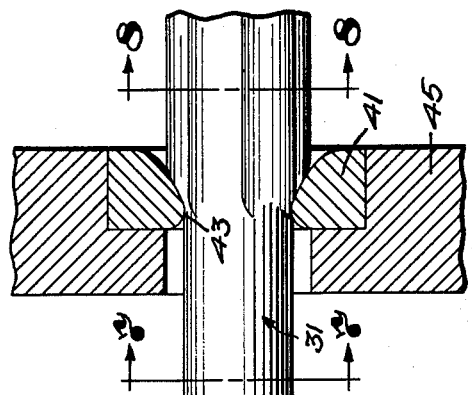
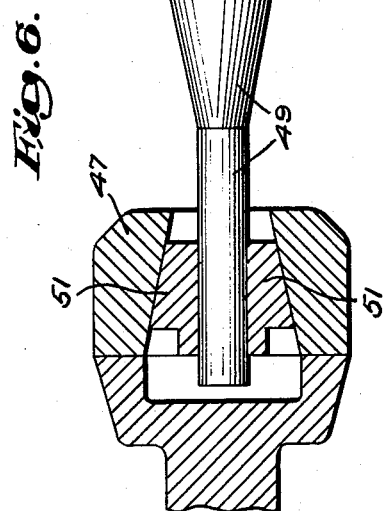
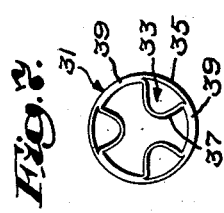
Inventor:
Richard A. Wilkins,
by Emery Booth Townsend Miller
& Weidner Attys

United States Patent Office 3,004,330
Patented Oct. 17, 1961

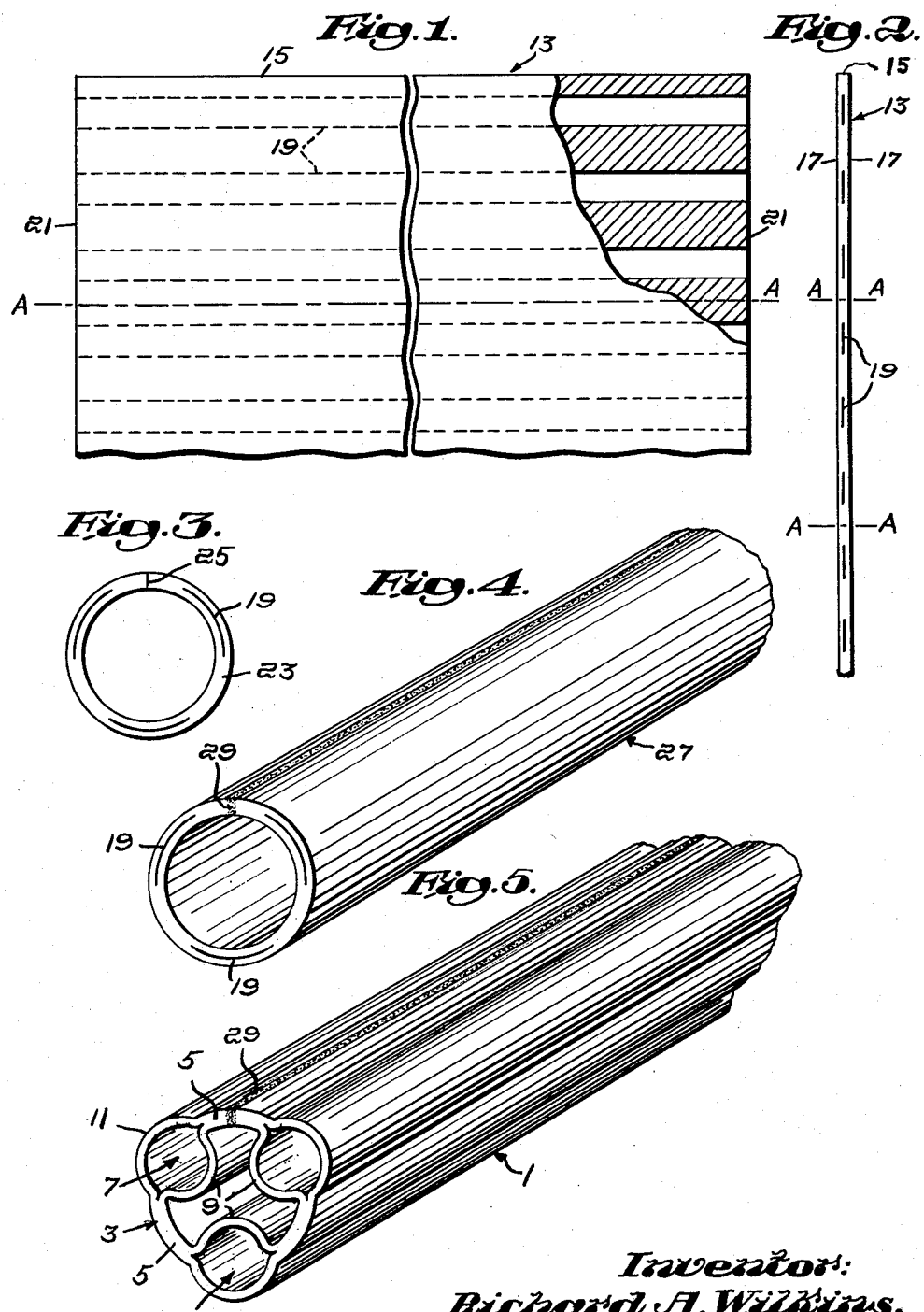

3,004,330
TUBES FOR STRUCTURAL AND FLUID CONDUCTING PURPOSES, AND METHODS OF MAKING THE SAME
Richard A. Wilkins, Rome, N.Y., assignor to Revere Copper and Brass Incorporated, Rome, N.Y., a corporation of Maryland
Filed May 23, 1957, Ser. No. 661,104
3 Claims. (Cl. 29—157.3)

My invention relates to reinforced tubular members capable of various uses, for example, structural purposes and the fluid conducting conduits of heat exchangers.

The invention has among its objects the provision of a metallic tubular member the wall of which includes one or more tubular conduits acting to stiffen and otherwise reinforce such wall, the walls of these conduits being in heat conductive relation to the interior space of such member.

The invention, however, will be best understood from the following description when read in the light of the accompanying drawings of several embodiments of the invention selected for illustrative purposes, while the scope of the invention will be more particularly pointed out in the appended claims.

In the drawings:

FIG. 1 is a fragmentary plan view, with parts broken away, of a sheet which may be employed as the starting material for making a tubular member according to the invention;

FIG. 2 is an end view of the sheet according to FIG. 1, on an enlarged scale;

FIGS. 3 and 4 illustrate successive steps in the method of forming a tubular member according to the invention employing the strip according to FIGS. 1 and 2 as the starting material, FIG. 4 being a perspective view of a welded tube, and FIG. 3 a transverse cross-section of the tube according to FIG. 4 prior to its being welded;

FIG. 5 is a perspective view of a tubular member, according to the invention, made by a method involving the steps indicated by FIGS. 1 to 4;

FIG. 6 more or less diagrammatically illustrates a step in operating on the member according to FIG. 5 to produce the member according to FIG. 7;

FIG. 7 is a section on the line 7—7 of FIG. 6, and indicates another form of tubular member according to the invention; and FIG. 8 is a section on the line 8—8 of FIG. 6.

Referring to the drawings, the metallic tubular member 1 illustrated by FIG. 5 comprises a wall 3 having the arcuate portions 5 each of the same angular extent and curvature. Such wall, as shown, also comprises the three tubular conduits 7 each separated from the others by the arcuate portions 5 lying at its opposite sides. Each conduit 7 is shown as roughly circular in transverse cross-section and comprises wall portions 9 which project into the interior space of the member, and wall portions 11 which project radially of the member beyond the exterior of the arcuate portions 5. These wall portions of the conduits 7 act to stiffen and otherwise reinforce the member.

As shown, the arcuate portions 5 are of equal thickness and the wall portions 9 and 11 are each one-half that thickness. However, as hereinafter more fully explained, the wall portions 9 and 11 may be of different thicknesses the sum of which is equal to the thicknesses of the arcuate portions 5. For example, the wall portions 9 may, if desired, be thinner than the wall portions 11, particularly when an interchange of heat is desired between the conduit presented by the interior of the member 1 and the interiors of the conduits 7, the total stiffening and reinforcing of the member commonly being somewhat increased when the wall portions 11 are thicker than the wall portions 9.

In making the member illustrated by FIG. 5 there may be employed, as a starting material, an elongated relatively thin gauge sheet 13 (FIGS. 1 and 2) of cold workable wrought metal, which sheet between its opposite side edges 15 and opposite faces 17 is formed with a row of spaced slits 19 parallel to each other and to said side edges and faces and opening on the opposite end edges 21 of the sheet. This sheet, when the member 1 is to be employed primarily for heat exchange purposes, may be of heat conductive metal such as copper, aluminum, brass, stainless steel, and the like. When the member is to be employed primarily for structural purposes it may be of less expensive and inherently stronger metal such as carbon steel and the like. However, when employed primarily for structural purposes where lightness in weight is an important consideration, such as in airplane construction, the metal advantageously may be aluminum. The thickness of the sheet employed will of course depend largely upon the use to which the member is to be put.

The slits 19 of the sheet 13 may be placed midway between the opposite faces 17 of the sheet, or where the thickness of the wall portion 9 is to be different from that of the wall portion 11 of the conduits 7 the slits may be placed correspondingly closer to one face 17 than to the other. The metal of the sheet being cold workable, the slits may be readily expanded to form tubular conduits by introduction thereinto of pressure fluid.

The sheet 13 is preferably made by any of the methods disclosed by applicant's co-pending applications Serial Number 518,768, filed June 29, 1955, Serial Number 570,372, filed March 8, 1956, and Serial Number 650,133, filed April 2, 1957. Briefly, such methods comprise casting the metal of a thick billet about a row of spaced parallel elongated rods or other elongated members of pulverizable material, and rolling such billet for elongating it in the direction of the lengths of said rods for thinning it and for moving opposite sides of the spaces occupied by them into such close proximity that they are substantially in contact and form the slits 19. Such rolling crushes the rods to a fine weld preventing powder which prevents welding during the rolling operation of the opposite faces of the slits to each other. By employing a thick billet having the requisite number of the pulverizable members the resulting relatively thin gauge slitted sheet produced by the rolling operation will be very long and contain more slits than necessary to produce the member 1. Such sheet commonly may be cut lengthwise and widthwise to produce many strips for use in making the member.

In making the member 1 from the sheet 13 said sheet, if it contains more slits 19 than correspond to the number of tubular conduits 7 of said member, may as it is unwound from a coil of the sheet be presented to a slitter which severs it along the lines A—A (FIGS. 1 and 2) to form a plurality of strips each having a number of slits 19 equal to said number of conduits 7. These strips as they are so formed may be wound into coils for convenience in handling them. From such coils the strip may be fed to a tube forming and welding machine. Preferably such machine employed is of a known construction which operates on the strip as it is fed to it to bend the strip transversely to a circular shape indicated at 23 (FIG. 3) and place its opposite side edges in contact as indicated at 25. As said edges are so brought into contact the machine causes the closely adjacent portions of the strip at laterally opposite sides of the point of contact to be subjected to a concentrated high frequency electric field which induces in the metal adjacent such point a current of high amperage, such current, among other things, by reason of so-called "skin effect" at said edges causes the metal at said edges to fuse together so that there is produced a tube 27 (FIG. 4) having the weld 29 extending longitudinally thereof, the walls of such tube having the spaced slits 19.

The slits of the tube 27 may then be expanded, by introduction thereinto of pressure fluid, to form the tubular conduits 7 of the member 1. For so expanding the slits the metal at opposite faces of one end of each slit may be pinched together, by use of a suitable clamp temporarily applied to the tube wall at that end, to close that end. The opposite end of the slit may be sufficiently slightly expanded by use of a suitable knife-edged tool to permit forcing into said end a short nozzle which may be temporarily secured to the tube by clamping it to the tube wall. By connecting such nozzle to a source of supply of pressure fluid, such as compressed air or water under pressure, pressure fluid may be entered into the slit to expand it to form a conduit 7. The clamps and the nozzle may then be removed and the ends of the portions of the tube to which they were applied may be severed from the body of the tube.

It will be observed that by making the tubular member 1 from the sheet 13 in the above described way the conduits 7 of such member are entirely seamless and are joined to the wall portions 5 of the member at their opposite sides by seamless joints.

In expanding the slits 19 in the way above described the pressure fluid, if of requisite degree of pressure, will expand the slits without materially stretching the metal, no form or die being necessary to determine the cross-sectional shape of the conduit. It will be understood, however, that if the metal at one side of the face of the slit is of different thickness from that at the opposite side, so that the wall portions 9 and 11 of the conduits 7 will be of different thicknesses, the thicker metal will not be expanded to the same extent as the thinner metal. It will be understood that the expansion of the slits, without stretching of the metal, reduces the circumference of the member 1, measured along a circle of radius that of the arcuate portions 5 thereof, to less than the circumference of the tube 27 of FIG. 4. For any tube 27 of given metal and transverse cross-sectional dimensions this reduction in circumference may be determined empirically, and the slits 19 of the sheet 13 be accordingly spaced apart distances necessary to compensate for it, so as to produce a member 1 of the desired transverse cross-sectional size. It will also be understood that the expansion of the slits acts to cold work the metal forming the walls of the conduits 7 so as somewhat to harden them and thereby augment the stiffening and reinforcing effect of said conduits on the member.

It will be understood that, although the tubular member 1 illustrated has three conduits 7, it may, particularly when the member is used for heat exchange purposes, say, when fluid conducted by the interior of the member is to be heated by a hot fluid passed through a conduit 7, have but one such conduit. Also the member may have any number of conduits 7 desired within such limitations as are imposed by their cross-sectional sizes and the cross-sectional size of the member.

Another form of the tubular member may have the transverse cross-sectional shape illustrated by FIG. 7. The tubular member 31 according to this form has a circular exterior as viewed in transverse cross-section, its wall comprising one or more conduits 33, each having an outer wall portion 35 and an inner wall portion 37, the outer surface of said outer wall portion forming part of the circular exterior of the member, and said inner wall portion lying wholly within the interior space of the member. As in the form of the member illustrated by FIG. 5 the tubular conduits are seamless and are joined to the wall portions indicated at 39 in FIG. 7 at their opposite sides by seamless joints.

The tubular member 31 according to FIG. 7 may be formed by drawing a tubular member 1 (FIG. 5) through the circular opening of a reducing die for depressing the wall portions 11 of the conduits 7 of such member 1 to give it a circular exterior as viewed in transverse cross-section. Such operation and apparatus for performing it are diagrammatically indicated by FIG. 6 in which 41 indicates a die having a circular die opening 43, the die being mounted in a stationary die holder 45. This die may be the ordinary die employed in connection with drawbenches for "sinking" tubes, that is to say, slightly reducing the diameter of a tube without employment of an interior "plug" for determining the wall thickness of the reduced tube. In the instant case the radius of the die opening 43 will be slightly less than that of the arcuate portions 5 of the tubular member 1, and determines the radius of the outer surface of the tubular member 31 produced by the drawing operation.

As diagrammatically shown by FIG. 6, associated with the die 41 is the conventional drawhead 47 of a drawbench, such head being mounted for reciprocation toward and away from the die. Preparatory to performing the drawing operation an end of the tubular member 1 will be presented to a known machine for "pointing" that end as indicated at 49, that is to say, reduce the end portion sufficiently to permit it to be inserted through the die opening for enabling it to be gripped between the jaws 51 of the drawhead upon the latter being moved into close proximity to the die. After the drawhead pulls the tubular member 1 through the die opening to produce the tubular member 31 such pointed end portion may be severed from the member 31.

The drawing operation, depending on the extent of the reduction produced by it, will more or less elongate the work, slightly reduce the thickness of its walls, and more or less reduce the cross-sectional areas of the conduits in those walls. The drawing operation will further work harden the metal to act to maintain the stiffness and reinforcement of the drawn member.

It will be understood that within the scope of the appended claims wide deviations may be made from the forms of the invention herein described without departing from the spirit of the invention.

I claim:

1. The method of making a tubular member for structural and for fluid conduction uses as in heat exchangers and having a circumferential wall with outer and inner sides and with one or more longitudinally coextensive tubular conduits within said wall between said outer and inner sides thereof, which comprises providing an elongated homogeneous monolaminar strip of cold workable metal rolled from a billet singly cast from one and the same melt, said strip having opposite major faces, opposite side edges and transverse end edges, said strip having between the opposite side edges and the opposite faces thereof one or more slits extending lengthwise of the strip and individually opening on the respective end edges of the strip, said slits each having sides which are parallel to said major faces of the strip and said slits each having edges which are parallel to said side edges of the strip; operating on the strip to bend it transversely to bring said opposite side edges thereof substantially into contact; welding together said contacted side edges to form a tube the walls of which are constituted by said strip with the slit or slits thereof extending longitudinally of such tube; and subsequently inflating said slit or slits of said tube to form a like number of tubular conduits by temporarily closing one of the ends and introducing into them from the opposite ends and whereby such conduits have walls which at their outer sides project laterally outwardly from the outer side of the resulting tubular member having said conduit or conduits and which at their inner sides project inwardly from the inner side of such resulting tubular member.

2. The method of making a tubular member of the character described, having a circumferential wall with one or more longitudinally coextensive in-wall tubular conduits which comprises providing an elongated unitary monolaminar strip of cold workable metal having opposite major faces, opposite side edges and transverse end edges, said strip having between its opposite side edges and opposite faces one or more slits extending lengthwise of the strip and individually opening on the opposite end edges of the strip, the sides of which said slits having sides which are parallel to said major faces of the strip and having edges which are parallel to said side edges of the strip; bringing together and uniting the opposite side edges of the strip to form a tube the walls of which are constituted by said strip with the slit or slits thereof extending longitudinally of such tube; expanding said slit or slits of said tube to form a tubular conduit or conduits having walls which at their outer sides project outwardly from the outer side of the resulting tubular member having said conduit or conduits and at their opposite sides project inwardly from the inner side of said member; and drawing such tubular member longitudinally through a die opening to depress such outwardly projecting wall portions of said conduit or conduits to cause said conduit or conduits to lie wholly inwardly of the outer surface of the circumferential wall of said member.

3. The method of making a tubular member of the character described having a circumferential wall with one or more longitudinally coextensive in-wall tubular conduits which comprises providing an elongated unitary monolaminar strip of cold workable metal having opposite major faces, opposite side edges and transverse end edges, said strip having between its opposite side edges and opposite faces on or more slits extending lengthwise of the strip and individually opening on the opposite end edges of the strip, the sides of which said slits having sides which are parallel to said major faces of the strip and having edges which are parallel to said side edges of the strip; bringing together and uniting the opposite side edges of the strip to form a tube the walls of which are constituted by said strip with the slit or slits thereof extending longiudinally of such tube; expanding said slit or slits of said tube to form a tubular conduit or conduits having walls which at their outer sides project outwardly from the outer side of the resulting tubular member having said conduit or conduits and at their opposite sides project inwardly from the inner side of said member; and drawing such tubular member longitudinally through a circular die opening to depress such outwardly projecting wall portions of said conduit or conduits to cause the outer surface of the circumferential wall of said member to be circular in cross-section transverse to said member and said conduit or conduits to lie wholly inwardly of such surface.

References Cited in the file of this patent

UNITED STATES PATENTS

| | | |
|---|---|---|
| 29,276 | Holmes | July 24, 1860 |
| 369,372 | Turner | Sept. 6, 1887 |
| 377,318 | Marshall | Jan. 31, 1888 |
| 490,630 | Ransome | Jan. 24, 1893 |
| 1,734,268 | Moorhouse | Nov. 5, 1929 |
| 2,000,906 | Turner | May 14, 1935 |
| 2,119,451 | Turner | May 31, 1938 |
| 2,190,494 | Templin | Feb. 13, 1940 |
| 2,440,533 | Antonson | Apr. 27, 1948 |
| 2,514,469 | Burkhardt | July 11, 1950 |
| 2,564,093 | Bijl | Aug. 14, 1951 |
| 2,655,181 | Cooper | Oct. 13, 1953 |
| 2,690,002 | Grenell | Sept. 28, 1954 |
| 2,722,733 | Meyer | Nov. 8, 1955 |
| 2,740,188 | Simmons | Feb. 13, 1956 |
| 2,856,162 | Adams | Oct. 14, 1958 |
| 2,906,006 | Neel | Sept. 29, 1959 |

FOREIGN PATENTS

| | | |
|---|---|---|
| 4,794 | Great Britain | Dec. 6, 1893 |